(12) United States Patent
Hyun et al.

(10) Patent No.: US 7,761,123 B2
(45) Date of Patent: Jul. 20, 2010

(54) SLIDING AND SWING TYPE PORTABLE TERMINAL

(75) Inventors: Sang-Min Hyun, Seoul (KR); Hyoung-Shin Park, Seoul (KR); Chang-Soo Lee, Incheon (KR)

(73) Assignee: Samsung Electronics Co., Ltd (KR)

( * ) Notice: Subject to any disclaimer, the term of this patent is extended or adjusted under 35 U.S.C. 154(b) by 1025 days.

(21) Appl. No.: 11/488,998

(22) Filed: Jul. 19, 2006

(65) Prior Publication Data

US 2007/0020992 A1  Jan. 25, 2007

(30) Foreign Application Priority Data

Jul. 20, 2005  (KR) ...................... 10-2005-0065817

(51) Int. Cl.
  *H04M 1/00* (2006.01)
(52) U.S. Cl. ............... 455/575.1; 455/575.3; 455/575.4
(58) Field of Classification Search ............. 455/550.1, 455/556.2, 575.1, 575.3, 575.4; 16/366, 16/367, 368
See application file for complete search history.

(56) References Cited

U.S. PATENT DOCUMENTS

| | | | |
|---|---|---|---|
| 7,092,744 B2 * | 8/2006 | Rodemer et al. | 455/569.1 |
| 7,099,708 B2 * | 8/2006 | Ronkko | 455/575.1 |
| 7,369,882 B2 * | 5/2008 | Hwang et al. | 455/575.1 |
| 7,496,389 B2 * | 2/2009 | Cho et al. | 455/575.4 |
| 2005/0091431 A1 | 4/2005 | Olodort et al. | |
| 2007/0072659 A1 * | 3/2007 | Ryu | 455/575.3 |

FOREIGN PATENT DOCUMENTS

| | | |
|---|---|---|
| EP | 1 600 843 | 11/2005 |
| KR | 1020040044213 | 5/2004 |
| KR | 1020050121526 | 12/2005 |
| WO | WO 03/050665 | 6/2003 |

* cited by examiner

*Primary Examiner*—Kamran Afshar
(74) *Attorney, Agent, or Firm*—The Farrell Law Firm, LLP (57) ABSTRACT

A sliding and swing type portable terminal that includes a first housing, and a second housing that slides in a transverse direction of the first housing and then swings to be aligned in a lengthwise direction of the first housing. Each of the sliding and swinging operations exposes a different set of keys, which enable different multimedia operation modes.

9 Claims, 6 Drawing Sheets

SLIDING AND SWING TYPE PORTABLE TERMINAL

PRIORITY

This application claims priority to an application entitled "Sliding/Swing Combination Type Mobile Phone for Multimedia" filed with the Korean Intellectual Property Office on Jul. 20, 2005 and assigned Serial No. 2005-65817, the contents of which are incorporated herein by reference.

BACKGROUND OF THE INVENTION

1. Field of the Invention

The present invention relates generally to a portable terminal, and more particularly to a portable terminal that is suitable for multimedia environment and that performs sliding and swing movements.

2. Description of the Related Art

Portable terminals are electronic devices that users can carry in order to perform some sort of wireless communication. In consideration of portability, portable terminals are generally compact, slim, and light, but must also be capable of providing multimedia capabilities to a user in order to handle a wide variety of functions. For example, future portable terminals will not only be used for conventional communication methods, but must also be suitable for functioning in a multimedia environment and for providing Internet access and functions.

Conventional portable terminals may be classified into various types according to their appearance, such as bar-type portable terminals, flip-type portable terminals, and folder-type portable terminals. The bar-type portable terminal has a single housing shaped like a bar. The flip-type portable terminal has a flip panel which is pivotally mounted to a bar-shaped housing by a hinge unit. The folder-type portable terminal has a folder coupled to a single bar-shaped housing by a hinge unit in such a manner that the folder can be rotated in order to be folded or unfolded from the housing.

Further, portable terminals may be classified as neck wearable-type terminals and wrist wearable-type terminals, according to the position at or the way in which a user wears the terminal. The neck wearable type terminal is one which a user wears around the neck using a lanyard or necklace, while the wrist wearable type terminal is one which a user wears around the wrist.

Additionally, portable terminals may be classified as rotation-type terminals and sliding-type terminals according to ways of opening and closing the terminals. In the rotation-type portable terminal, two housings are coupled to each other in a manner that one housing rotates to be opened or closed relative to the other while facing each other. In the sliding-type portable terminal, two housings are coupled to each other in a manner that one housing slides to be opened or closed relative to the other. The various classifications of portable terminals are easily understood by those skilled in the art.

Additionally, conventional portable communication terminals have been converted to enable voice communication and a high-speed data communication. That is, as consumer demands have increased, various services have been provided using wireless communication technology for transmitting and receiving data at a high speed.

It is a present tendency to have a camera lens mounted to the portable communication terminal, and that it is possible to transmit image signals and the like. Meanwhile, present portable communication terminals are provided with an embedded or external camera lens module. Therefore, it is possible to perform image communication with a desired partner or to photograph a desired subject.

Korean Patent Application 2002-71911, which is assigned to Samsung Electronics Co. Ltd., discloses a common sliding type portable terminal that is suitable for voice communication. However, this type of portable terminal has a problem in that a user has difficulties viewing a display unit in game, chatting, message sending, digital multimedia broadcasting (DMB) modes, etc., while operating keys. Further, in the sliding type portable terminal according to the Korean Patent Application, because the slider slides lengthwise on the body, the sliding distance becomes longer as the sliding module connecting the slider to the body becomes longer. As a result, there is a disadvantage in that large space is required to mount the sliding module in the portable terminal, thereby decreasing mounting efficiency.

Furthermore, in the future multimedia environment, portable terminals must provide a wider variety of services. In spite of this requirement, the conventional portable terminal can hardly provide a user with an optimal interface under the more convergent multimedia environment.

For example, the conventional portable terminals may provide an interface useful for one mode, e.g., proper for either voice communication, photographing, or message transmission. That is, the conventional portable terminals cannot provide an optimal interface environment, i.e. data input/output environment, that is useful for all three of the modes. Accordingly, in an attempt to provide a portable terminal with data input/output environment suitable for more various modes, the conventional portable terminals must have a large size.

More specifically, as the future portable terminals will provide more services centered around entertainment, for example, a game mode and a DMB mode, a liquid crystal display unit, which is used as a data output device, will be required to display a landscape view screen. Furthermore, there is a need to provide the portable terminal with an interface that is suitable for the user to conveniently operate keys in a chatting mode. Additionally, a landscape view function of the display unit and two-handed key operation are very important in the game mode. Therefore, as the future portable terminal will function as a game player, a TV receiver, and etc., as well as a voice communication device, there is a need for a portable terminal suitable for a future multimedia environment.

SUMMARY OF THE INVENTION

Accordingly, the present invention has been designed to solve the above and other problems occurring in the prior art. An object of the present invention is to provide a portable terminal that is suitable for use in a selected mode in a multimedia environment providing various modes.

Another object of the present invention is to provide a portable terminal, which has a display unit to display a landscape view screen in a DMB mode, a game mode, a camera mode, and a chatting mode, and still enables a user to easily operate keys.

Still another object of the present invention is to provide a portable terminal that is stable and can be easily opened and closed by one hand of a user.

Still another object of the present invention is to provide a portable terminal in which a sliding rail of a sliding module extends across a body to have a shorter sliding distance, thereby increasing the efficiency of a space to mount the sliding module.

Still another object of the present invention is to provide a portable terminal which includes a mechanism to prevent twisting during sliding and to function as a stopper after a completion of the sliding, so as to stably operate in the sliding or swing movement.

Still another object of the present invention is to provide a portable terminal in which an efficiency of mounting parts such as a display unit, keys, and a sliding and swing mechanism is improved.

Still another object of the present invention is to provide a portable terminal including a QWERTY key arrangement, after the sliding movement, while having 3×4 metrics key arrangement, after the swing movement, so that a user can selectively use keys.

In order to accomplish the above and other objects, there is provided a portable terminal including: a first housing; a second housing that slides in a transverse direction of the first housing to be parallel with the first housing, and swings to be aligned in a lengthwise direction of the first housing, after the sliding movement, while facing the first housing; and a mechanism for sliding the second housing in the transverse direction of the first housing and for swinging the second housing, after the completion of the sliding movement.

BRIEF DESCRIPTION OF THE DRAWINGS

The above and other objects, features, and advantages of the present invention will be more apparent from the following detailed description taken in conjunction with the accompanying drawings, in which.

DETAILED DESCRIPTION OF THE PREFERRED EMBODIMENT

Hereinafter, preferred embodiments of the present invention will be described with reference to the accompanying drawings. In the following description of the present invention, a detailed description of known functions and configurations incorporated herein is omitted to avoid making the subject matter of the present invention unclear.

Referring to FIGS. 1 and 4A to 5C, the portable terminal according to the present invention slides in only a first mode, while swinging in a second mode, which can be performed after the sliding movement of the first mode. The first mode relates to displaying a landscape view screen, which includes a game mode, a DMB mode, a camera mode, a chatting mode, etc. The second mode relates to a basic communication, which includes a communication mode, a message sending mode, etc.

More specifically, the portable terminal according to the present invention includes a first housing 10, a second housing 20 and a mechanism for connecting the first housing 10 to the second housing 20. The first housing 10 includes a bar type housing. The second housing 20 also includes a bar type housing to correspond to a shape of the first housing 10. The second housing 20 slides in a transverse direction of the first housing 10 (See FIGS. 4B and 5B). After sliding, the second housing 20 swings to align in a lengthwise direction of the first housing 10 (See FIG. 5C).

The second housing 20 slides in the transverse direction of the first housing 10 to open and close a first region of an upper surface 101 of the first housing 10. As a preferred embodiment of the present invention, the first region includes a first keypad 110 and a second keypad 112.

After sliding open, when the second housing 20 swings open to expose a second region of the upper surface 101 of the first housing 10. As a preferred embodiment of the present invention, the first region includes a third keypad 111.

More specifically, the first housing 10 includes the first keypad 110 that is only exposed when the second housing 20 slides in the transverse direction of the first housing 10, the second keypad 112 that is only exposed when the second housing 20 swings to align in a lengthwise direction of the first housing 10, which also covers the first keypad 110, and a third keypad 111 that is exposed when the second housing 20 slides or swings. That is, the third keypad 111 is always exposed when the second housing 20 is moved, i.e., slid or swung, on the first housing 10.

Preferably, the first and third keypads 110 and 111 have a QWERTY key arrangement, and the second and third keypads 112 and 111 have a 3×4 metrics key arrangement.

Preferably, the second housing 20 includes a receiver 210, a display unit 212, and a navigation key 214 arranged thereon. For example, a liquid crystal display (LCD) unit and/or a touch screen can be used as the display unit 212, and the navigation key 214 includes a four way key.

Figure 4A:
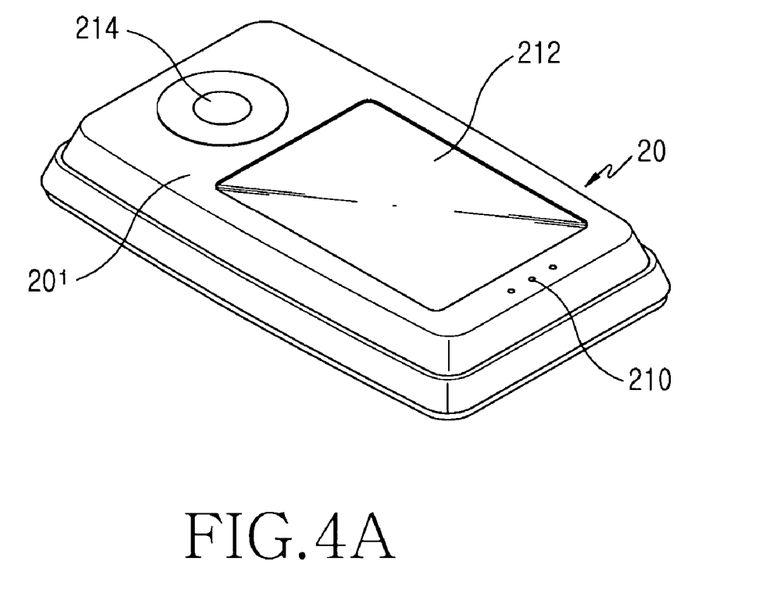
FIGS. 4A and 4B are perspective views illustrating a sliding and swing type portable terminal according to the present invention, in which the opening process of the second housing of the portable terminal is shown in a first mode.
Figure 4B:
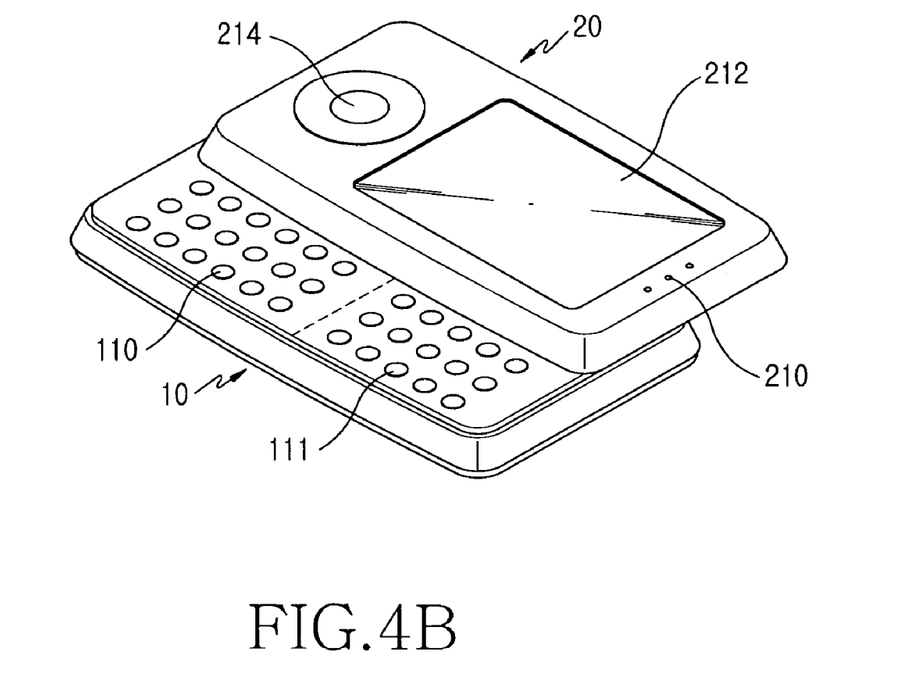

FIGS. 4A and 4B illustrate the second housing 20 sliding transversely on the first housing 10. More specifically, FIG. 4A illustrates the second housing 20 before sliding and FIG. 4B illustrates the second housing 20 after sliding, wherein the first and third keypads 110 and 111 are exposed for use.

Figure 5A:
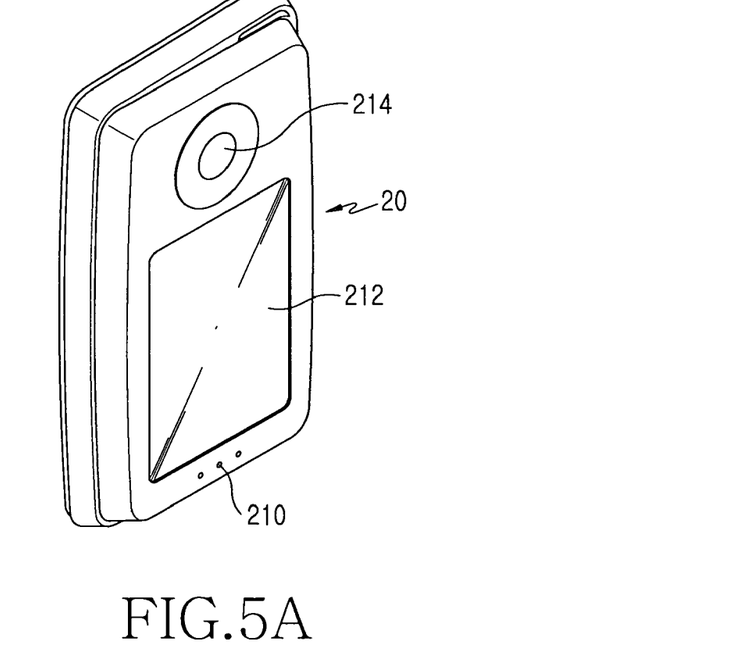
FIGS. 5A to 5C are perspective views illustrating a sliding and swing type portable terminal according to the present invention, in which the opening processes of the second housing of the portable terminal are shown in a second mode.
Figure 5B:
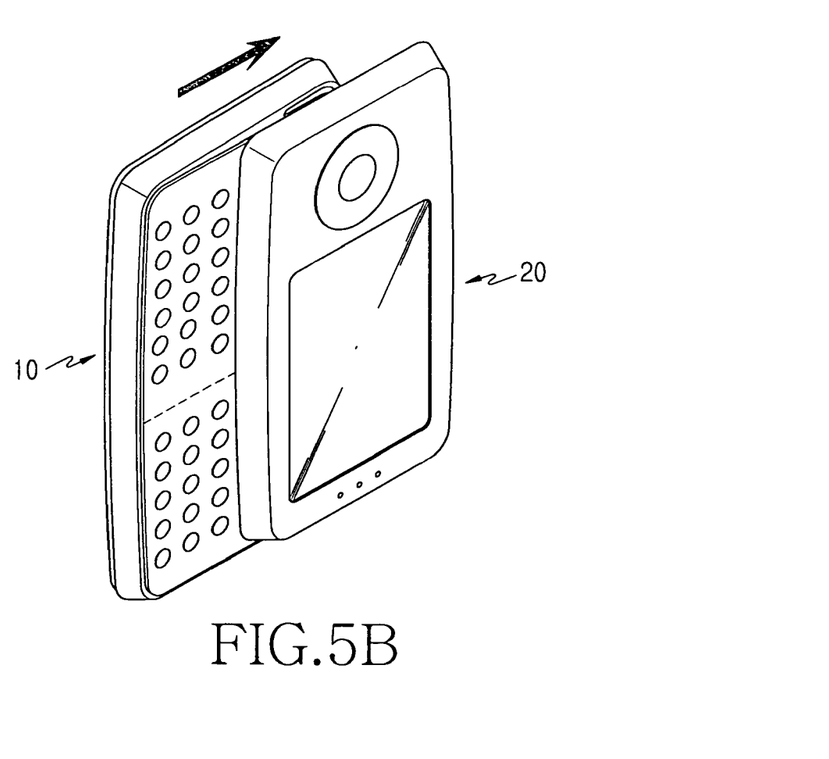
Figure 5C:
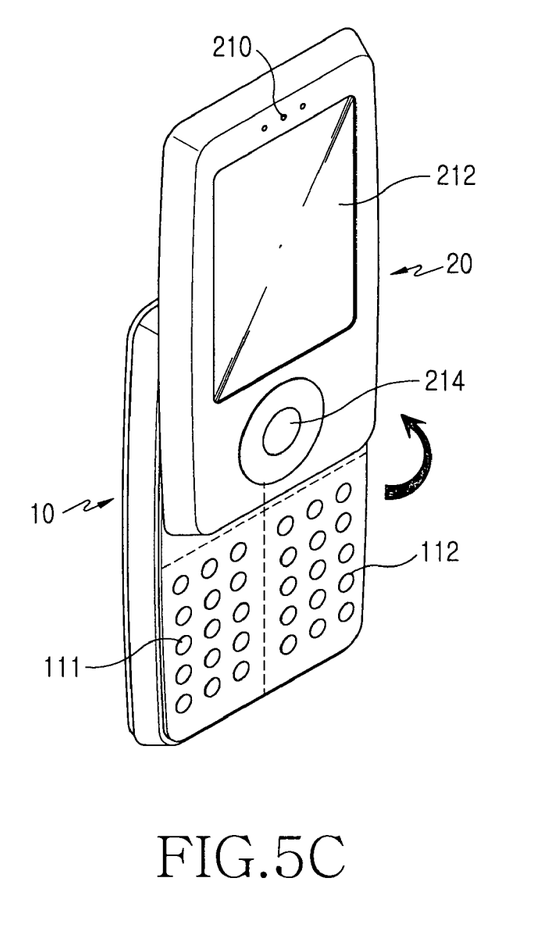

FIGS. 5A to 5C illustrate the second housing 20 sliding transversely and then swinging on the first housing 10 to align in the lengthwise direction of the first housing 10. More specifically, FIG. 5A illustrates the second housing 20 before sliding, FIG. 5B illustrates the second housing 20 after sliding, and FIG. 5C illustrates the second housing 20 after sliding and swinging. It is noted in FIG. 5C, that after the sliding and swinging operations, the second and third keypads 112 and 111 are exposed for use. Preferably, the second housing 20 cannot swing until after the completion of the sliding.

As illustrated in FIGS. 4A and 4B, when the second housing 20 has slid transversely on the first housing 10, the display unit 212 can be used in the first mode, e.g., a DMB mode, a game mode, or a camera mode, to display the landscape view screen. In the first mode, the display unit 212 displays a landscape view screen, and the first and third keypads 110 and 111 are exposed and usable. Accordingly, a user can operate the first and third keypads 110 and 111 with both hands while easily watching the display unit 212.

As illustrated in FIGS. 5A to 5C, when the second housing 20 has slid and swung on the first housing 10, the display unit 212 can be used in the second mode, e.g., a communication mode, a message sending mode, etc., to display a portrait view screen. In the second mode, the display unit 212 displays the portrait view screen, and the second and third keypads 112 and 111 are exposed and usable. Accordingly, the user can operate the second and third keypads 112 and 111 while watching the display unit 212.

Additionally, it is noted that the navigation key 214 is continuously exposed and usable.

Figure 1:
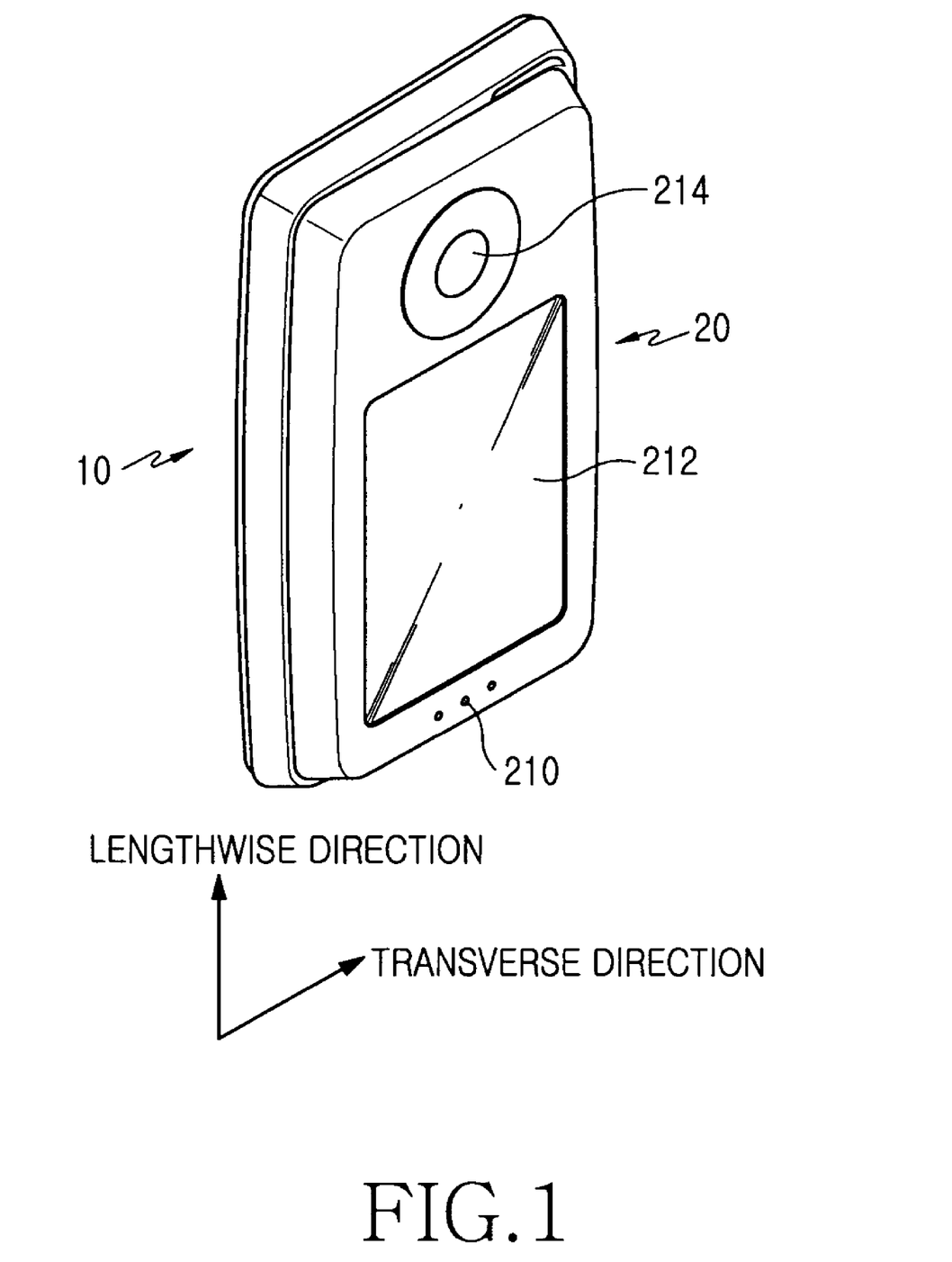
FIG. 1 is a perspective view illustrating a sliding and swing type portable terminal according to the present invention.
Figure 2:
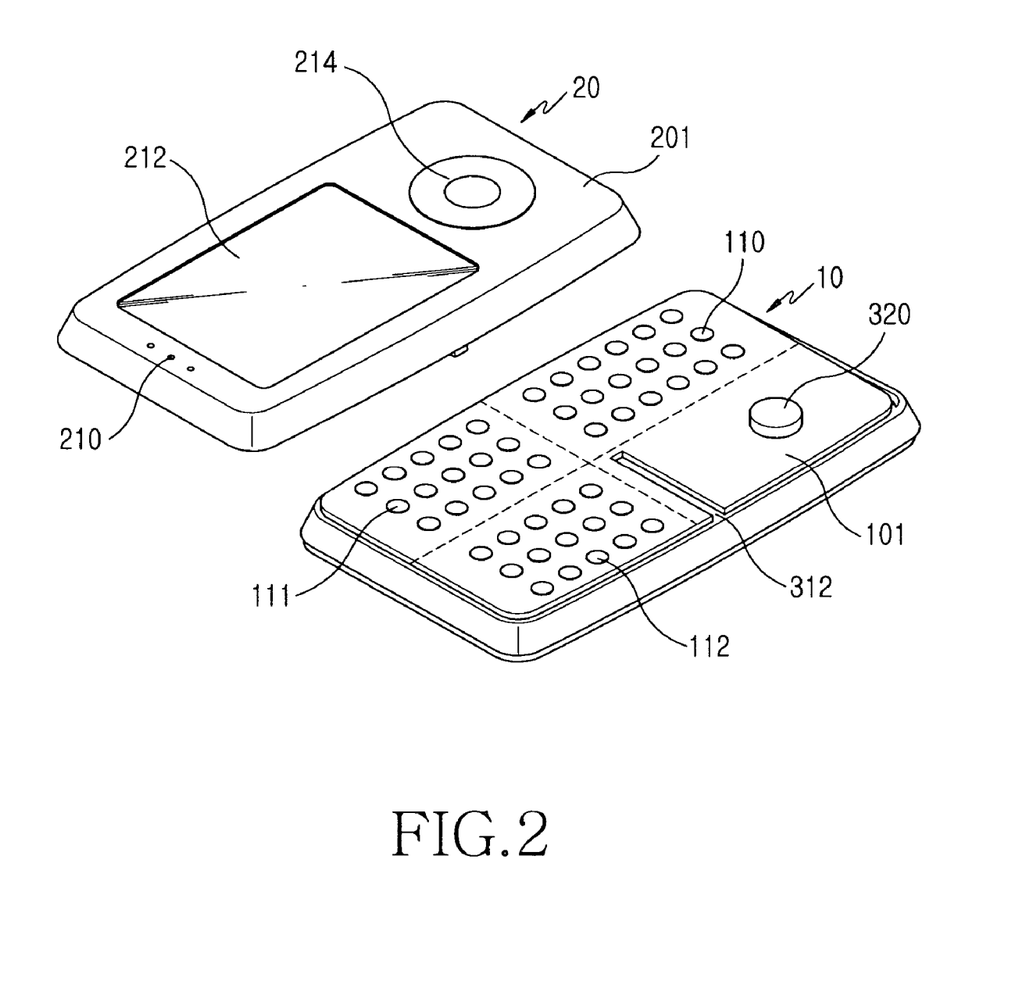
FIGS. 2 and 3 are perspective views illustrating a sliding and swing type portable terminal according to the present invention, in which first and second housings are separated from each other.
Figure 3:
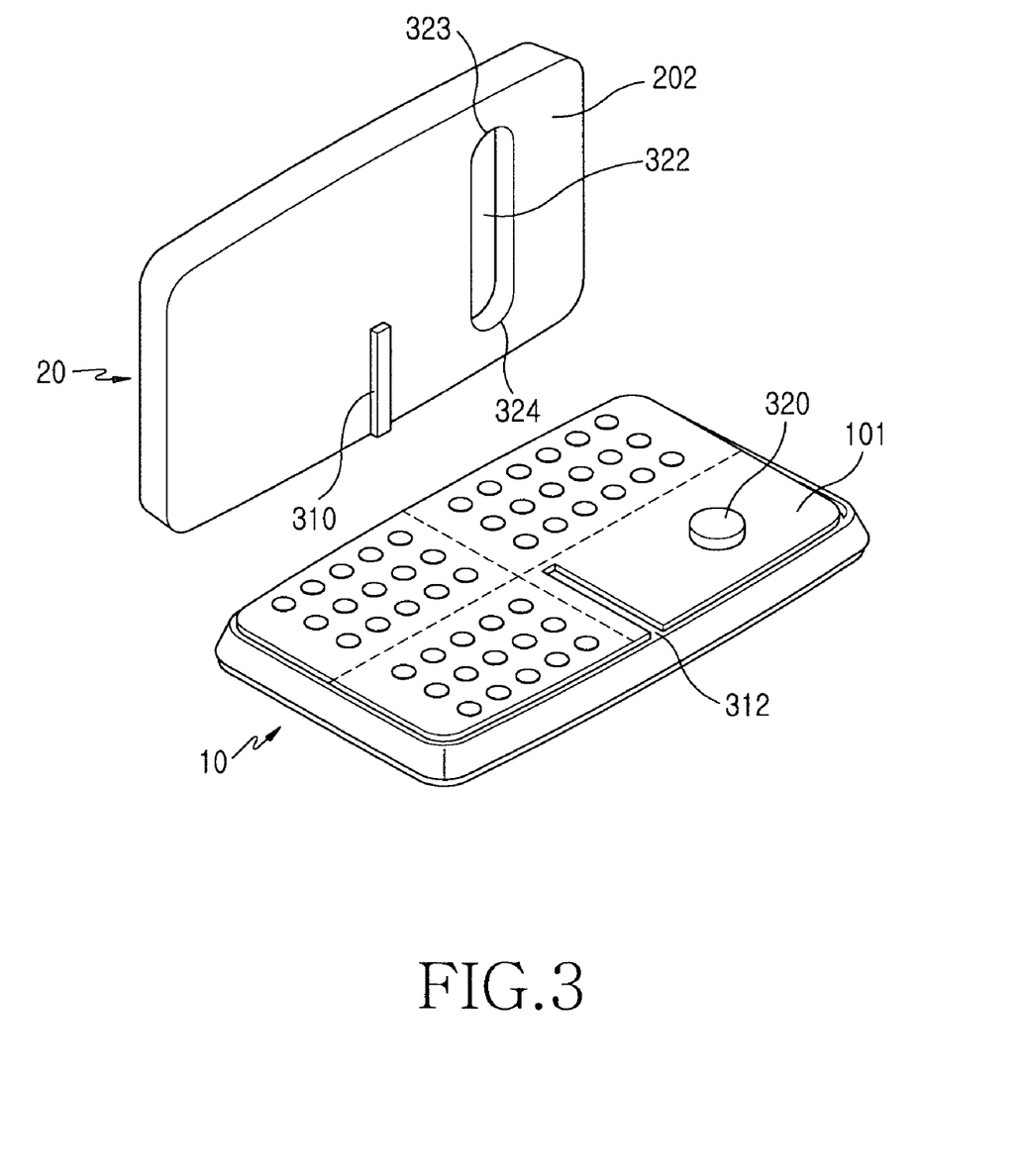

Referring to FIGS. 2 and 3, a mechanism to slide and swing the second housing 20 on the first housing 10 includes a sliding guide means that guides the transverse sliding of the second housing 20 to prevent the second housing 20 from twisting during sliding and stop the swing movement of the second housing 20 after the completion of the swing movement, and a sliding and swing means that guides the transverse sliding movement and the swing movement of the second housing 20.

Preferably, the sliding guide means includes a first slot 312, which is formed in the upper surface 101 of the first housing 10, and a restraint member 310, which is inserted in the first slot 312 to move along the first slot 312 in order to guide the second housing 20 in the transverse direction while preventing the second housing 20 from twisting during the sliding movement. Additionally, the restraint member 310 can act as a stopping member by sliding out from the first slot 312 after the second housing 20 completes the slide, and then butting against a top side of the first housing 10, when the second housing 20 completes swing.

Preferably, the first slot 312 is formed in a rectangular shape at a predetermined portion of the upper surface 101 of the first housing 10, and the restraint member 310 has a rail shape, which is formed at a desired portion of the bottom surface 202 of the second housing 20 to linearly extend from an edge to the center of the second housing 20 at a predetermined distance.

The sliding and swing means includes a sliding/swing module 320, which is disposed on one of quadrant of the upper surface 101 of the first housing 10 to provide a swing axis for the second housing 20, and a second slot 322, which receives the sliding/swing module 320 to help the transverse sliding movement of the second housing 20 and which is parallel with the sliding guide means. The sliding/swing module 320 protrudes from the upper surface 101 of the first housing 10, a preferably has a cylindrical shape. The second slot 322 is formed parallel with the first slot 312, of which both ends have a semi-circular shape to receive the sliding and swing module 320. As a result, the combination of the restraint member 310 and the first slot 312 and the combination of the sliding/swing module 320 and the second slot 322 help the second housing 20 to slide on the first housing 10.

Referring to FIG. 5C, the restraint member 310 protruded from the bottom surface 202 of the second housing 20 comes into contact with an upper end of the first housing 10 to function as a stopper restricting the swing movement of the second housing 20. This helps a user to conveniently and stably swing the second housing 20.

It is noted that only essential elements of the mechanism to slide and swing the second housing 20, i.e., the sliding guide means and the sliding/swing means, are illustrated in drawings. A more detailed structure is omitted in the drawings to avoid making the subject matter of the present invention unclear.

Figure 6:
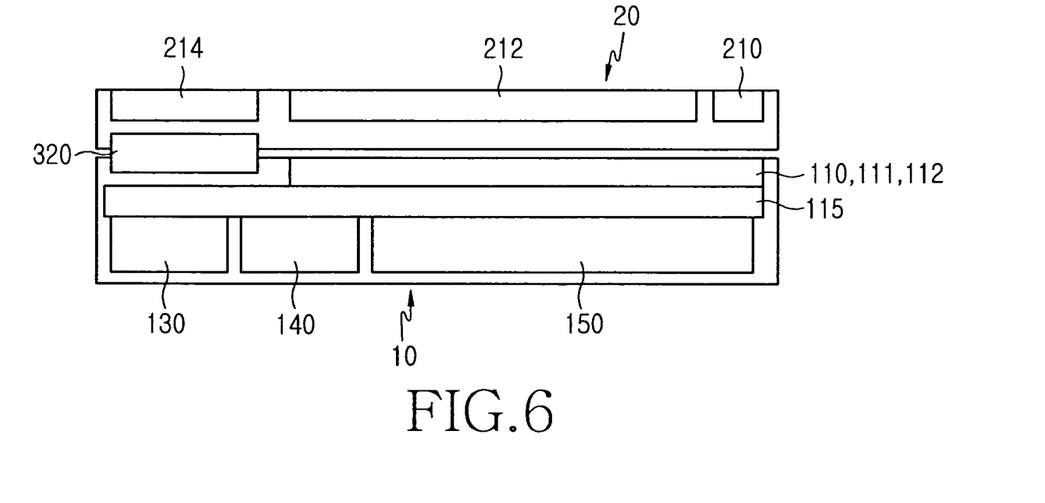
FIG. 6 is a schematic view illustrating a mounting state of principal elements of a sliding and swing type portable terminal according to the present invention.

FIG. 6 is a schematic view illustrating a mounting state of principal elements of a sliding and swing type portable terminal according to the present invention. Referring to FIG. 6, the sliding and swing type portable terminal according to the present invention includes two housings, i.e. the first and second housings 10 and 20. The first housing 10 includes a printed circuit board 115, which has the first, second and third keypads 110, 111, and 112 disposed thereon, and an internal antenna 130, a camera lens module 140, and a battery pack 150 disposed below the printed circuit board 115. The second housing 20 includes the display unit 212, the navigation key 214, and the receiver 210. The sliding/swing module 320 is disposed between navigation key 214 and the internal antenna. That is, the navigation key 214, the sliding/swing module 320 and the internal antenna are aligned in order.

The sliding and swing movements of the second housing 20 can be performed automatically, semi-automatically, or manually. For example, when the second housing 20 slides and swings semi-automatically, a known-elastic member can be used as a driving source. When the second housing 20 swings automatically, a known electric motor and reduction gears connected with the electric motor can be used as the driving source. The mentioned-known reduction gears are well-known elements consisting of a plurality of gears, which are contained in a gearbox. Of course, reduction ratio of the reduction gears is determined by a gear engagement or the number of gear teeth.

As described above, the present invention provides the portable terminal that is suitable for use in a number of selected modes in a multimedia environment. The present invention has advantages of displaying the landscape view screen in modes requiring for the landscape mode, while providing the convenient key operation.

Further, because the present invention enables the second housing to slide in the transverse direction instead of the lengthwise direction of the first housing, and also the sliding and swing module provides a swing axis and helps the sliding movement of the second housing, a mounting efficiency of the parts can be increased.

Further, while the second housing slides in the transverse direction of the first housing, it is possible to prevent the twisting of the second housing.

In addition, as the sliding guide member can function as a stopper to restrict the swing movement of the second housing after the completion of the swing movement, the opening and closing of the second housing can be easily and stably carried out.

Further, the present invention has another advantage in that a user can select display modes of the display unit, for example, landscape mode or portrait mode and that the QWERTY key arrangement and 3×4 metrics key arrangement are applied for the user to conveniently operate keys.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A portable terminal comprising:
   a first housing;
   a second housing that slides in a parallel transverse direction of the first housing, and then swings to be aligned in a lengthwise direction of the first housing while facing the first housing; and
   a mechanism for sliding the second housing in the transverse direction of the first housing and for swinging the second housing, after the completion of the sliding movement,
   wherein the mechanism comprises:
   a sliding guide means for guiding the transverse sliding of the second housing and preventing the second housing from twisting during the sliding movement, and for stopping the swing movement of the second housing, after the completion of the swing; and a sliding/swing means for guiding the transverse sliding movement and the swing movement of the second housing, and wherein the sliding/swing means comprises:

a sliding and swing module, which is disposed on an upper surface of the first housing, for providing a swing axis for the second housing; and a first slot on a bottom surface of the second housing, which is parallel with the sliding guide means, for receiving the sliding and swing module, and guiding the sliding and swing module during the transverse sliding movement of the second housing.

2. The portable terminal as claimed in claim 1, wherein the second housing slides to expose a first region of the upper surface of the first housing and swings to expose a second region of the upper surface of the first housing.

3. The portable terminal as claimed in claim 1, wherein the first housing includes a plurality of keys on the upper surface thereof, and the second housing includes a display unit on an upper surface thereof.

4. The portable terminal as claimed in claim 3, wherein the plurality of keys comprise:

a first keypad, which is exposed only when the second housing slides;

a second keypad, which is exposed when the second housing swings; and a third keypad, which is exposed when the second housing slides and when the second housing swings.

5. The portable terminal as claimed in claim 1, wherein the sliding guide means comprises:

a second slot formed in the upper surface of the first housing; and a restraint member, which is inserted in the second slot to move along the second slot, for guiding the second housing to slide and for stopping the second housing from swinging by departing from the second slot after the second housing completes the sliding and then butting against an edge of the first housing.

6. The portable terminal as claimed in claim 5, wherein the second slot and the restraint member extend transversely on the first housing, which are linearly formed.

7. The portable terminal as claimed in claim 1, wherein the sliding/swing module has a cylindrical shape, and the first slot has a semi-circular shape at both ends of thereof.

8. The portable terminal as claimed in claim 1, wherein the first and second housings are bar-type housings.

9. The portable terminal as claimed in claim 1, wherein the second housing cannot swing until after the sliding is complete.

* * * * *